United States Patent

Haller et al.

(10) Patent No.: US 9,372,487 B2
(45) Date of Patent: Jun. 21, 2016

(54) FLUIDIC ACTUATOR

(71) Applicant: Hoerbiger Automatisierungstechnik Holding GmbH, Altenstadt (DE)

(72) Inventors: Daniel Haller, Landsberg am Lech (DE); Max Schrobenhauser, Peiting (DE); Erich Rankl, Rott (DE); Marcus Grodl, Altdorf (DE)

(73) Assignee: Hoerbiger Automatisierungstechnik Holding GmbH, Altenstadt (DE)

( * ) Notice: Subject to any disclaimer, the term of this patent is extended or adjusted under 35 U.S.C. 154(b) by 0 days.

(21) Appl. No.: 14/640,549

(22) Filed: Mar. 6, 2015

(65) Prior Publication Data

US 2015/0177741 A1 Jun. 25, 2015

Related U.S. Application Data

(63) Continuation of application No. PCT/EP2013/002599, filed on Aug. 29, 2013.

(51) Int. Cl.
*F15B 13/043* (2006.01)
*G05D 7/06* (2006.01)
(Continued)

(52) U.S. Cl.
CPC ............ *G05D 7/0676* (2013.01); *F15B 11/006* (2013.01); *F15B 11/10* (2013.01);
(Continued)

(58) Field of Classification Search
CPC ..... G05D 7/0676; F15B 11/006; F15B 11/10; F15B 13/0405; F15B 2211/30575; F15B 2211/31; F15B 2211/329; F15B 2211/565; F15B 2211/7052; F15B 2211/7656; Y10T 137/7761; Y10T 137/7762; Y10T 137/87201; Y10T 137/87209; Y10T 137/86614; Y10T 137/7768

USPC .................... 137/596.15, 596.16, 487.5, 488, 137/625.64, 489.5; 251/129.04, 30.01
See application file for complete search history.

(56) References Cited

U.S. PATENT DOCUMENTS 2,342,770 A * 2/1944 Temple .................. F15B 13/04
137/596.2
3,403,700 A * 10/1968 Meynell ................ F16K 11/166
137/607

(Continued)

FOREIGN PATENT DOCUMENTS

DE 2654219 A1 6/1987
DE 19502212 C1 7/1996
(Continued)

OTHER PUBLICATIONS

International Search Report mailed Oct. 31, 2013 in corresponding International Application No. PCT/EP2013/002599.
(Continued)

*Primary Examiner* — Craig Schneider
*Assistant Examiner* — Minh Le
(74) *Attorney, Agent, or Firm* — Myers Wolin, LLC

(57) ABSTRACT

The invention relates to a fluidic actuator comprising a drive element (2) that can be supplied with a pressure fluid and a two-stage proportional position controller (3) controlling the supply with pressure fluid to the drive element, said actuator comprising an electro-fluidic pilot stage (10) of the position controller, exactly one electromechanical transducer (14) and exactly one proportional valve (16) actuated by said transducer and having a pressure fluid inlet (18), a control pressure outlet (19) and a discharge outlet (20). A fluidic power stage (11) of the position controller comprises two poppet valves (24, 25) having associated pressure-to-distance converters that are supplied by a common control chamber (34) which is connected to the control pressure outlet (19) of the pre-stage (10).

17 Claims, 4 Drawing Sheets

(51) Int. Cl.
*F15B 11/00* (2006.01)
*F15B 11/10* (2006.01)
*F15B 13/04* (2006.01)
*F16K 11/14* (2006.01)

(52) U.S. Cl.
CPC ............ *F15B13/0405* (2013.01); *F16K 11/14* (2013.01); *F15B 2211/30575* (2013.01); *F15B 2211/31* (2013.01); *F15B 2211/329* (2013.01); *F15B 2211/565* (2013.01); *F15B 2211/7052* (2013.01); *F15B 2211/7656* (2013.01); *Y10T 137/87201* (2015.04)

(56) References Cited

U.S. PATENT DOCUMENTS

| | | | | |
|---|---|---|---|---|
| 3,770,012 | A * | 11/1973 | Bitzer | F15B 11/18 137/119.02 |
| 4,067,357 | A * | 1/1978 | Ruchser | F15B 13/0405 137/596.15 |
| 5,094,260 | A * | 3/1992 | Stuart | G05D 16/202 137/102 |
| 5,343,894 | A * | 9/1994 | Frisch | F15B 5/003 137/625.44 |
| 5,431,182 | A * | 7/1995 | Brown | G05B 6/05 137/487.5 |
| 5,779,218 | A * | 7/1998 | Kowanz | F16K 31/006 251/129.06 |
| 5,931,180 | A * | 8/1999 | Nagasaka | G05B 19/19 137/487.5 |
| 6,217,506 | B1 * | 4/2001 | Phillips | F16K 31/047 137/102 |
| 6,512,960 | B1 * | 1/2003 | Schulz | G05B 19/19 137/487.5 |
| 6,584,999 | B2 * | 7/2003 | Inayama | G05D 16/2093 137/102 |
| 6,705,347 | B2 * | 3/2004 | Itzhaky | F16K 31/006 137/625.44 |
| 7,284,471 | B2 * | 10/2007 | Jacobsen | F15B 13/04 91/433 |
| 7,779,863 | B2 * | 8/2010 | Jacobsen | F15B 11/042 137/596.15 |
| 8,439,329 | B2 * | 5/2013 | Kresse | F15B 19/002 137/625.64 |
| 8,979,064 | B2 * | 3/2015 | Nomiyama | F16K 37/00 137/488 |
| 2007/0045579 | A1 * | 3/2007 | Wirtl | G05D 16/163 251/129.04 |
| 2009/0146088 | A1 * | 6/2009 | Kleegrewe | F04B 43/04 251/12 |
| 2010/0037762 | A1 * | 2/2010 | Kleegrewe | F15B 20/004 91/45 |
| 2011/0240891 | A1 * | 10/2011 | Inagaki | F15B 5/003 251/30.01 |
| 2012/0260993 | A1 * | 10/2012 | Penning | F15B 11/006 137/1 |
| 2014/0060029 | A1 * | 3/2014 | Meinhof | F15B 19/005 60/399 |

FOREIGN PATENT DOCUMENTS

| | | |
|---|---|---|
| DE | 19537493 C1 | 12/1996 |
| DE | 0822344 A2 | 2/1998 |
| DE | 102007058518 A1 | 6/2009 |
| DE | 10 2009 023706 A1 | 12/2010 |
| EP | 0918939 B1 | 11/2002 |
| EP | 1758007 A1 | 2/2007 |
| EP | 1751640 B1 | 5/2010 |
| GB | 2485049 A | 5/2012 |

OTHER PUBLICATIONS

English Translation of the International Preliminary Report on Patentability dated Sep. 3, 2014 in corresponding International Application No. PCT/EP2013/002599.

* cited by examiner

FLUIDIC ACTUATOR

CROSS REFERENCE TO RELATED APPLICATIONS

This application is a continuation under 35 U.S.C. §120 of International Application PCT/EP2013/002599, filed Aug. 29, 2013, which claims priority to German Application 10 2012 017 713.5, filed Sep. 7, 2012, the contents of each of which are incorporated by reference herein.

FIELD OF THE INVENTION

The present invention relates to a fluidic, especially pneumatic positioning drive, especially a valve-positioning drive, comprising a drive element to which pressurized fluid (especially compressed air) can be admitted and a proportional position regulator that regulates the admission of pressurized fluid to the drive element.

BACKGROUND

Fluidic valve-positioning drives are known in various designs and are in service. In this regard, examples such as DE 19537493 C1, EP 1751640 B1, EP 918939 B1, DE 102009023706 A1, EP 1758007, GB 2485049 A, EP 822344 A2 and DE 19502212 C1 can be cited.

As can he inferred in detail from the various prior art documents cited in the foregoing, fluidic positioning drives having a proportional position regulator are typically decidedly complex. This is disadvantageous not only as regards the manufacturing costs. A complex fluidic interconnection of the individual components of the positioning drive additionally conceals the danger of some instabilities of the system.

DE 102007058518 A1 discloses a pneumatic valve-positioning drive that also comprises a drive element to which compressed air can be admitted and a proportional position regulator that regulates the admission of compressed air to the drive element, but compared with the prior art explained hereinabove (e.g. DE 102009023706 A1) is characterized in that the electrofluidic pilot stage comprises precisely one electromechanical transducer (piezoelectric bending transducer) and precisely one proportional valve (nozzle/baffleplate system) actuated thereby. The control-pressure inlets of the two valves of the power stage are in communication with the output of the proportional valve via corresponding control-pressure lines.

The object of the present invention is to create remedies for the disadvantages of the prior art explained hereinabove, especially by providing a fluidic positioning drive of the type mentioned in the introduction, characterized by a reliable function and high operating safety in combination with relatively low complexity, while at the same time achieving higher efficiency than in the fluidic positioning drive according to DE 102007058518 A1.

SUMMARY

This object is achieved according to the present invention by the fluidic positioning drive specified in detail in the claims. This is therefore characterized by a plurality of features interacting synergetically in their technical functions, wherein it is characteristic among other aspects for the inventive position regulator (which is constructed in two stages, comprising an electrofluidic pilot stage and a fluidic power stage) that the two valves of the power stage are constructed as poppet valves and are mounted in a common housing and that the electrofluidic pilot stage comprises precisely one electromechanical transducer and precisely one proportional valve actuated thereby, wherein the control-pressure outlet of the electrofluidic pilot stage acts on a control chamber of the fluidic power stage. Two pressure-displacement transducers are then pressurized from that (common) control chamber, which is disposed between the poppet valves in the housing accommodating the two poppet valves, each transducer acting on one of two poppet valves of the fluidic power stage. The first of these two poppet valves is biased into an open position and the second of the two poppet valves into a closed position when the control chamber is unpressurized. These two pressure-displacement transducers are designed and matched to one another in such a way that a clear hierarchy of actuation of the two poppet valves (i.e. sequential actuation of the two poppet valves) exists over a pressure variation, i.e. a rise in pressure within an operating range, specifically in such a way that the first poppet valve is closed progressively at first and, only after the first poppet valve has been closed completely, is the second poppet valve opened progressively. In this way a unique correlation of the pressure in the control chamber with the operating point defined by the switched state of the two poppet valves and vice versa is achieved. By virtue of such a unique correlation in the sense of a unique characteristic of the position regulator, this can be easily kept under control by regulating systems despite its little structural and apparatus-related complexity, and so instabilities in particular can be avoided. In addition, the inventive position regulator is characterized, in a manner different from that applicable for position regulators using slide valves, by a power stage that is completely leak-free (or at any rate suffers negligible leakage), which is an outstanding advantage in particular from viewpoints of efficiency, because hereby true "shutoff" or "hold" of the connected drive element (see hereinafter) is possible without continuous admission of pressurized fluid.

This matching of the two pressure-displacement transducers to one another in the sense of the explained hierarchy or actuation sequence as used in the scope of the present invention can be achieved by suitable engineering design of the area ratios of the two pressure-displacement transducers on which the control pressure prevailing in the control chamber acts, and also by matching the biasing forces acting on the two poppet valves not only to one another but also to the respective associated active area of the pressure-displacement transducer in question.

Because of the proportional operation of pilot and main stages of the position regulator, a particularly long useful life of the positioning drive—significantly longer than that of pulse-width-modulated activation of the drive element—is achieved, and specifically not least because all valves experience predominantly a partial deflection during operation and only rarely are actuated over their entire range of movement.

According to a first preferred improvement of the present invention, both poppet valves are closed within a partial range—constituting a "shutoff range"—of the working-pressure range for the control pressure. In other words: During a rise of the pressure within the working-pressure range, the second poppet valve does not open more or less simultaneously, i.e. at the same control pressure at which the first poppet valve closes completely. To the contrary, a more or less pronounced range within which both poppet valves are closed exists instead for the control pressure. Particularly preferably, this shutoff range in question occupies between 10% and 30% of the control-pressure range attainable on the whole by the control pressure. This is of great advantage for stable operating behavior. In addition, this is favorable from viewpoints of efficiency, because hereby a contribution is made toward preventing any kind of internal air consumption in the power stage in the said shutoff range. This reduces the load on the pressure supply at the respective "hold" operating point, i.e. for maintaining the respective working point of the drive element. It is only upon a change of the working point of the drive element—for example for opening or closing the valve actuated by the positioning drive in question—that internal consumption of pressurized fluid then takes place in the power stage of the positioning drive. Particularly preferably, the individual components of this positioning drive are matched to one another in such a way that a certain symmetry of the operating characteristic exists, in such a way that the mean value of the control-pressure range preferably lies within the shutoff range explained in the foregoing.

Another preferred improvement of the present invention is characterized in that the working-pressure range makes up between 95% and 85% of the control-pressure range attainable in total by the control pressure. In this sense, it is particularly preferable that, for example, a change of the control pressure causes a change of the position of the two poppet valves "only" over 90% of the control-pressure range attainable in total by the control pressure. This means, for example, that the first and the last 5% of the control-pressure range are "dead", in the sense that closing of the first poppet valve begins only when the control pressure reaches or exceeds 5% of the maximum control pressure and that opening of the second poppet valve is completed when the control pressure reaches 95% of the maximum control pressure.

According to yet another particularly preferred improvement, the units respectively comprising a poppet valve and the associated pressure-displacement transducer have a nonlinear path of the characteristic curve of opening cross section versus control pressure. Instead, the characteristic curve is preferably flat in the neighborhood of the respectively completely closed range of the poppet valve in question, in the sense that a given change of the opening cross section requires a larger change of the control pressure than in a range further removed from the completely closed valve. In other words, for both poppet valves the gradient determining the ratio of the opening cross section to the control pressure is flatter, particularly preferably when it is close to the respective closing point, than when it is further removed from the respective closing point. This permits particularly sensitive pressurization of the drive element of the positioning drive in the context of fine regulation, especially of the valve actuated by the positioning drive. This in turn is also a viewpoint of great advantage with regard to the stability of regulation. Corresponding matching of the components with regard to the said nonlinearity can therefore be applied not only to the respective pressure-displacement transducer, especially to the characteristic of the respective restoring spring. To the contrary, such matching is also possible at the poppet valves themselves. Specifically this can be achieved by constructing them with soft-sealing capability, in which case it is particularly preferable to provide a soft valve seat with a hardness between Shore 70 and Shore 85 respectively. To generate the said flat gradient of the characteristic curve, the sealing edges can be matched in such a way to the hardness of the respective valve seat that—by appropriate shaping—an opening gap is formed at first not over the entire circumference of the sealing edge but instead only over a partial extent of the sealing edge. It is particularly advantageous as regards the soft-sealing properties of the poppet valve explained in the foregoing when the valve seat is constructed on a captive seal, wherein the sealing edge is particularly preferably constructed on the movable valve member (closing member).

Another preferred improvement of the invention is characterized in that an associated control-pressure diaphragm, which seals off the control chamber from a first valve chamber of the respective poppet valve, is joined to the spindle of each poppet valve. The control-pressure diaphragm in question is then part of the respective pressure-displacement transducer and provides the active area for the control pressure. The pressure conditions in the control chamber, varying according to the hierarchy of actuation of the two poppet valves as explained in detail in the foregoing, can then be established in particular by exerting appropriate influences on the control-pressure diaphragms, especially with regard to dimensioning, thickness and/or choice of material, in such a way that the pressure-displacement transducer associated with the second poppet valve responds only at higher control pressures than does the pressure-displacement transducer associated with the first poppet valve.

In this connection, a second diaphragm sealing off the second valve chamber of the respective poppet valve from the environment is particularly preferably joined to the spindle of each poppet valve. Nevertheless, other forms of sealing off the respective second valve chamber from the environment can be considered for technical implementation of the present invention. The said second diaphragm can also be used to achieve the characteristic of the hierarchical actuation of the two poppet valves with varying pressure conditions that is essential for the present invention.

Yet another preferred improvement of the invention is characterized in that the units respectively comprising a poppet valve and the associated pressure-displacement transducer are disposed diametrically opposite one another. In this connection the valve spindles of the two poppet valves may (but do not have to) lie on an identical axis. Hereby the possibility—which is particularly attractive from the viewpoint of regulating systems—is created of determining the switched state of the power stage of the position regulator exactly by means of a single sensor, which measures the relative distance from one another of elements of the two pressure-displacement transducers that react to control pressure and/or of the valve spindles. Thus the signal of a single sensor can provide information about the position of both poppet valves and therefore about the actual operating point of the position regulator. The signal in question can then be fed back as an "actual signal" to the regulating unit of the position regulator. In the design respect, it is then particularly favorable when the sensor is disposed on a control platen, which in turn is disposed between elements (such as a control-pressure diaphragm) of the two pressure-displacement transducers that react to control pressure. In any case, in embodiments in which a sensor in the sense explained in the foregoing is provided to measure the relative distance from one another of elements of the two pressure-displacement transducers that react to control pressure and/or of the valve spindles, no rigid coupling of the pressure-displacement sensors and/or valve spindles associated with the two poppet valves exists.

According to yet another preferred improvement of the invention, the electromagnetic transducer of the pilot stage is constructed as a piezoelectric bending transducer, in the interests of particularly compact and at the same time reliable and efficient positioning drives. Such a bending transducer working on the piezoelectric principle can be reliably operated with extremely low electrical actuating energy, which is favorable for inherently safe operation. In this case, it is particularly preferable for the pilot stage to be integrated structurally into the housing of the power stage or built directly onto it. This is possible specifically when air is used as the pressurized fluid of the pilot stage. If the air volumes are appropriately minimized by the shortest possible communication paths, particularly stiff operating behavior with highly dynamic, extremely short reaction times can be achieved, thus reducing the risk of oscillations and resonances, which would be detrimental for the regulation behavior. Under comparable viewpoints, the volume of the control chamber is also preferably minimized.

The present invention can be implemented with special benefits when the drive element of the positioning drive has precisely one fluidic working chamber, which is in communication via a working outlet of the power stage with the first valve chambers, which are adjacent to the control chamber, of both poppet valves, wherein the second valve chamber of the first poppet valve is in communication with a pressurized-fluid vent and the second valve chamber of the second poppet valve is in communication with a pressurized-fluid supply. Such a design makes logical use of the options provided by the invention and makes available an efficient, compact, reliable positioning drive.

Particularly preferably, the pilot stage of the positioning drive is operated with a pressurized fluid, by means of which—via the power stage—the drive element of the positioning actuator is also pressurized. In any case, this is possible for a pneumatic positioning drive, in which both the drive element and the pilot stage of the proportional positioning regulator are operated with compressed air.

Both the pilot stage of the position regulator and its power stage can then be fed from the same compressed-air supply, in which case it is particularly preferable for a pressure limiter to be connected upstream from or associated with the compressed-air inlet of the pilot stage.

Finally, from viewpoints of engineered safety, it is particularly favorable for the poppet valves of the power stage to occupy a switched position identical to that during failure of the pressurized-fluid supply in the absence of electrical input signal to the pilot stage. In this way the identical switching behavior of the position regulator is obtained regardless of which component or which range (electrical or pneumatic/hydraulic) of the positioning drive is affected by a disturbance or malfunction, so that the drive element pressurized thereby always occupies the identical predetermined position during failure. In this way reliable fail-safe behavior is guaranteed.

BRIEF DESCRIPTION OF THE DRAWINGS

The present invention will be explained in more detail hereinafter on the basis of the preferred exemplary embodiments illustrated in the drawing, wherein.

DETAILED DESCRIPTION OF THE PREFERRED EMBODIMENTS

Figure 1:
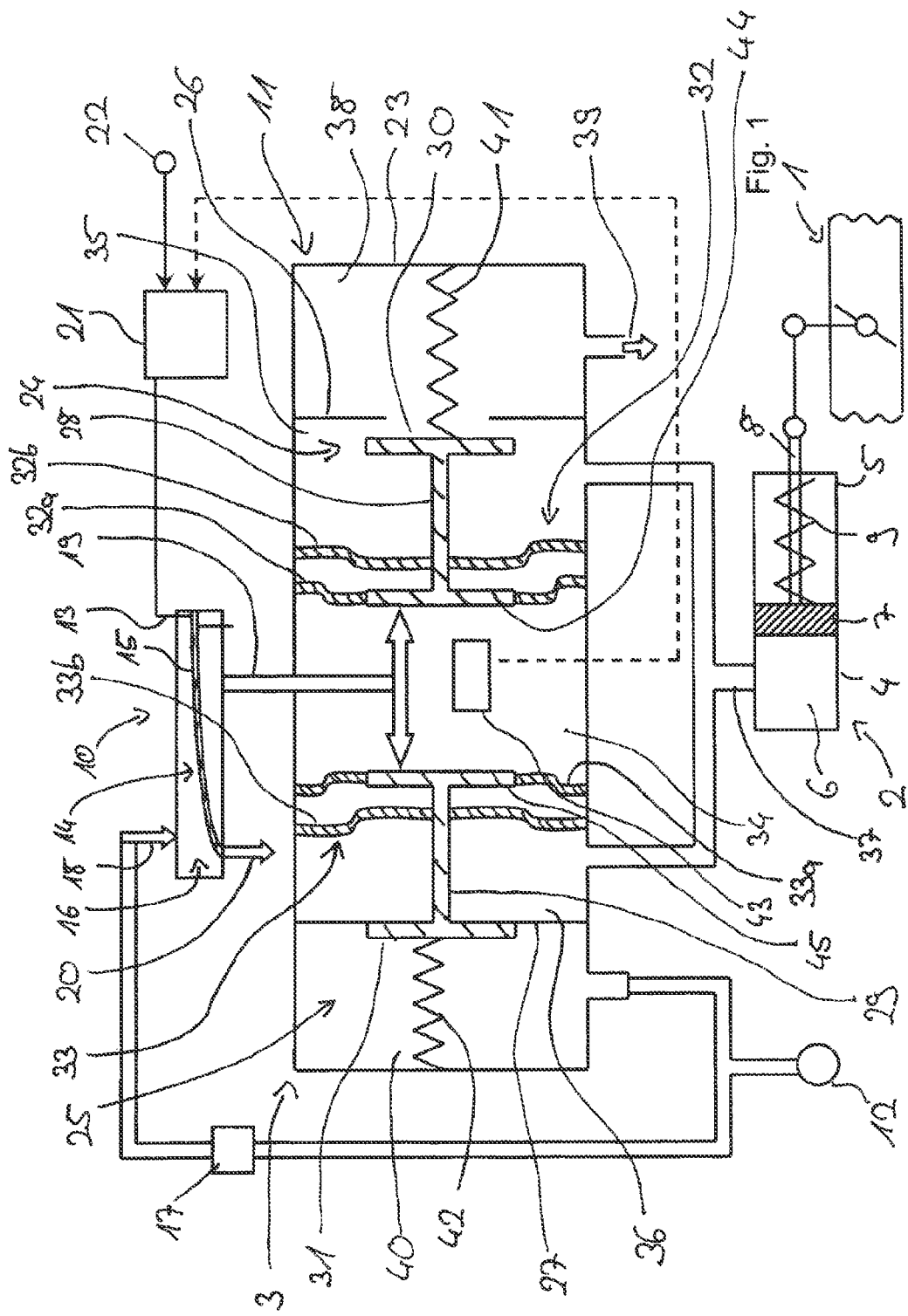
FIG. 1 shows a schematic diagram of a first exemplary embodiment of a pneumatically constructed inventive positioning drive.

The pneumatic positioning drive illustrated in FIG. 1 comprises, for actuation of a valve 1, a drive element 2 that can be pressurized with compressed air and a proportional position regulator 3 that regulates the pressurization of the drive element with compressed air. This drive element 2 is constructed in the form of a single-action pneumatic cylinder 4, which in a manner known in itself comprises a housing 5, a piston 7 plus piston rod 8 guided sealingly and displaceable therein and bounding a variable-volume working chamber 6, and a biasing or restoring spring 9 acting on piston 7.

The pneumatic positioning drive illustrated in FIG. 1 comprises, for actuation of a valve 1, a drive element 2 that can be pressurized with compressed air and a proportional position regulator 3 that regulates the pressurization of the drive element with compressed air. This drive element 2 is constructed in the form of a single-action pneumatic cylinder 4, which in a manner known in itself comprises a housing 5, a piston 7 plus piston rod 8 guided sealingly and displaceably therein and bounding a variable-volume working chamber 6, and a biasing or restoring spring 9 acting on piston 7.

Proportional positioning regulator 3 is constructed in two stages with an electropneumatic pilot stage (upstream stage) 10 and a pneumatic power stage 11. Both pilot stage 10 and power stage 11 are supplied by one and the same compressed-air supply 12.

Electropneumatic pilot stage 10 comprises an electrical signal input 13, precisely one electromechanical transducer 14 in the form of a piezoelectric bending transducer 15 and precisely one proportional valve 16 that can be actuated thereby having a compressed-air inlet 18 connected—via pressure-reducing valve 17—to compressed-air supply 12, a control-pressure outlet 19 and a vent outlet 20. In a manner known in itself, the pressure present at control-pressure outlet 19 depends on the specific geometry of piezoelectric bending transducer 15, which in turn depends on the voltage present at electrical signal input 13. Electrical input 13 in turn is connected via a regulating unit 21 with setpoint input 22.

Pneumatic power stage 11 comprises two poppet valves 24 and 25 mounted in the form of a valve group in housing 23 and disposed in diametrically opposite positions, each comprising a valve seat 26 and 27 respectively disposed in fixed relationship to the housing and a valve spindle 28 and 29 respectively with closing members 30 and 31 respectively disposed thereon. These valve spindles 28 and 29 respectively are joined sealingly and in fixed relationship with double-walled diaphragm units 32 and 33 respectively, while the space disposed within housing 23 between the two diaphragm units 32 and 33 forms a control chamber 34, to which control pressure outlet 19 of piezoelectric pilot stage 10 is connected. In detail, valve spindle 28 of poppet valve 24 is joined in fixed relationship to a pressure plate 44, which is a functional part of "control-pressure diaphragm" 32a, which in turn forms the wall of (double-walled) diaphragm unit 32 facing control chamber 34. The second wall of diaphragm unit 32 forms a "chamber diaphragm" 32b, wherein the space between control-pressure diaphragm 32a and chamber diaphragm 32b is unpressurized and supplied by air. An analogous situation exists for second poppet valve 25. Diaphragm units 32 and 33 seal control chamber 34 from a first valve chamber 35 or 36 respectively of poppet valve 24 or 25 respectively, wherein the two first valve chambers 35 and 36 respectively communicate with one another and with a common working outlet 37 of power stage 11, which in turn is in communication with pneumatic working chamber 6 of drive element 2. Second valve chamber 38 of first poppet valve 24 is then in communication with a compressed-air vent 39, while second valve chamber 40 of second poppet valve 25 is in communication with compressed-air supply 12. Pilot stage 10 can be integrated structurally in housing 23 of power stage 11 or can be built directly onto it, although this is not explicitly shown in the drawing.

Biasing or restoring springs 41 and 42 respectively act on both valve spindles 28 and 29 respectively, and specifically in such a way that, of the two poppet valves 24 and 25 of power stage 11—in the absence of pneumatic pressurization, i.e. when control chamber 34 is unpressurized (see hereinafter)—a first, namely first poppet valve 24 shown at the right in FIG. 1, is biased in an opened position, whereas the second, namely second poppet valve 25 shown at the left in FIG. 1, is biased in a closed position. For each of the two poppet valves 24 and 25, the functional combination of diaphragm units 32 and 33 respectively and biasing or restoring springs 41 and 42 respectively form a pressure-displacement transducer—acting on the respective closing members 30 and 31 in question of the respective valve spindles 28 and 29 in question—in the sense that the position of the respective valve spindle 28 and 29 is guided by the pressure (control pressure) prevailing in control chamber 34. The diametrically opposite arrangement of the two poppet valves 24 and 25 already mentioned in the foregoing then also extends to the two pressure-displacement transducers, by means of which, in other words, poppet valves 24 and 25 can be actuated pneumatically. This is important to the extent that the two pressure-displacement transducers are pressurized from a common control chamber 34, which is in communication with control-pressure outlet 19 of pilot stage 10.

The pressure-displacement transducer associated with first poppet valve 24 is matched to the pressure-displacement transducer associated with second poppet valve 25 (see FIG. 2) in such a way that, during a steady pressure rise in control chamber 34, i.e. during steadily rising control pressure p via a limited—by a lower operating pressure B1 and an upper operating pressure B2—working pressure range, first poppet valve 24 is progressively closed at first and second poppet valve 25 is then progressively opened only after first poppet valve 24 has closed completely. Both poppet valves 24 and 25 are closed within a partial range—constituting a shutoff range S—of the working pressure range for the control pressure, wherein the shutoff range occupies approximately 20% of the control pressure range attainable in total by the control pressure. The mean value of the control-pressure range therefore lies within shutoff range S.

Figure 2:
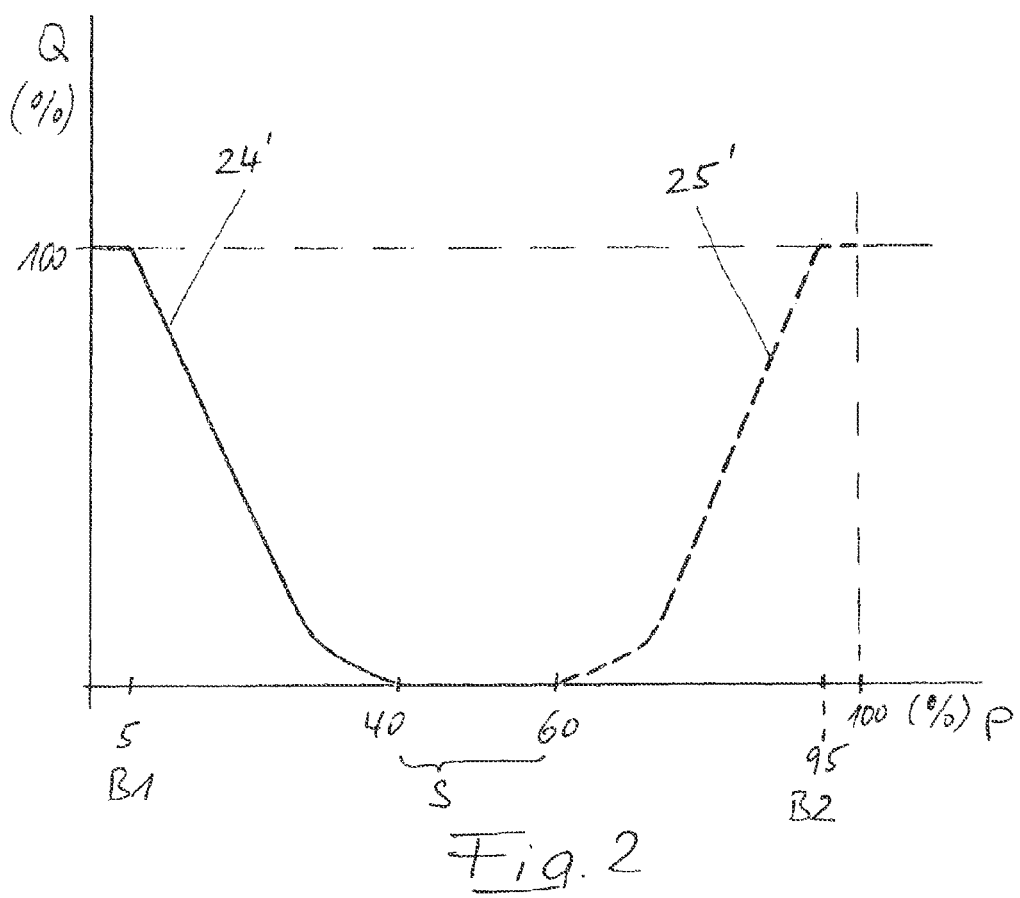
FIG. 2 shows a characteristic curve of the power stage, i.e. the opening cross sections of the two poppet valves versus the control pressure.

The working-pressure range makes up approximately 90% of the control-pressure range attainable in total by the control pressure, which means that the respective positions of the two poppet valves 24 and 25 do not change in the lowest 5% and in the highest 5% of the control-pressure range. As illustrated in FIG. 2, the units respectively comprising a poppet valve 24 or 25 and the associated pressure-displacement transducer have a nonlinear shape of characteristic curve 24' or 25' of opening cross section Q versus control pressure p. In each case, a flat characteristic curve is present respectively close to or adjacent to shutoff range S, in the sense that a relatively large change—compared with the ranges of the performance characteristics further removed from shutoff range—S of control pressure p is necessary for a change of opening cross section Q of poppet valve 24 or 25 by a given extent. Such nonlinearities can be obtained in particular not only by suitable matching of valve seats 26 and 27 respectively and closing members 30 and 31 respectively to one another but also by adjustments on the part of the pressure-displacement transducers (e.g. of diaphragm units 32 and 33 respectively and/or of biasing and restoring springs 41 and 42 respectively).

The design explained in the foregoing leads to the following mode of operation of the positioning drive: If the control pressure prevailing in control chamber 34 is gradually raised—starting from an initially unpressurized state—by appropriate pressurization of electropneumatic pilot stage 10 by setpoint input 22 and via regulating unit 21, first poppet valve 24 begins to close after a pressure rise of approximately 5% (relative to the control-pressure range attainable in total by the control pressure), in which case the opening cross section of first poppet valve 24 changes relatively rapidly at first then much more slowly later, by virtue of the characteristic curve explained in the foregoing. At approximately 40% of the maximum control pressure, the first poppet valve is completely closed. As the control pressure continues to rise, the position of poppet valves 24 and 25 does not change until the control pressure reaches approximately 60% of the maximum value; at this point both poppet valves are shut off. It is only upon a further rise of the control pressure that second poppet valve 25 is opened, which actually happens gradually at first and then later more rapidly, specifically until it has reached its completely open position at approximately 95% of the maximum control pressure.

By virtue of this characteristic of position regulator 3 and of the interfacing of compressed-air supply 12 and drive element 2 therewith as described in the foregoing, working chamber 6 of drive element 2 is shut off at a control pressure within shutoff range S (40% to 60% of the control pressure), is in communication with compressed-air vent 39 within the pressure range located between 0% and 40% (for different opening cross sections of first poppet valve 24) and is in communication with compressed-air supply 12 within the pressure range located between 60% and 100% (for different opening cross sections of second poppet valve 25). Accordingly, depending on the control pressure prevailing in control chamber 34, valve 1 is held (in the absence of internal air consumption of power stage 11), is closed more or less dynamically or else is opened again more or less dynamically.

The position regulator comprises a sensor 43, which is disposed in control chamber 34 between the two poppet valves 24 and 25 and which measures the relative distance between the two pressure plates 44 and 45 joined fixed relationship to valve spindles 28 and 29 respectively of poppet valves 24 and 25 respectively. A signal corresponding to the distance in question—and therefore characteristic of the current operating point of power stage 11—is fed by sensor 43 as a feedback actual value to regulating unit 21. Instead of the distance between pressure plates 44 and 45, it would also be possible as an alternative for sensor 43 to measure the distance between other elements—between which it is disposed, possibly on a control platen—of the two pressure-displacement transducers that react to control pressure. In this respect, it must be ensured that the pressure-displacement transducers and/or valve spindles 28 and 29 associated with the two poppet valves 24 and 25 are not rigidly coupled with one another.

Pilot stage is constructed in such a way that control chamber 34 is unpressurized in the absence of an electrical input signal imposed on it, and so first poppet valve 24 is open and second poppet valve 25 is closed. As a consequence of this, working chamber 6 of drive unit 2 is unpressurized and piston 7 of drive unit 2 occupies the position dictated by biasing and restoring spring 9. In this way, in the event of failure of regulating unit 21 (or of a comparable defect) on the side of pilot stage 10, the position of poppet valves 24 and 25 of power stage 11—and also the position of drive element 2—is identical to that in the case of failure of compressed-air supply 12. Thus the positioning drive has a definite and unambiguous fail-safe behavior.

Figure 3:
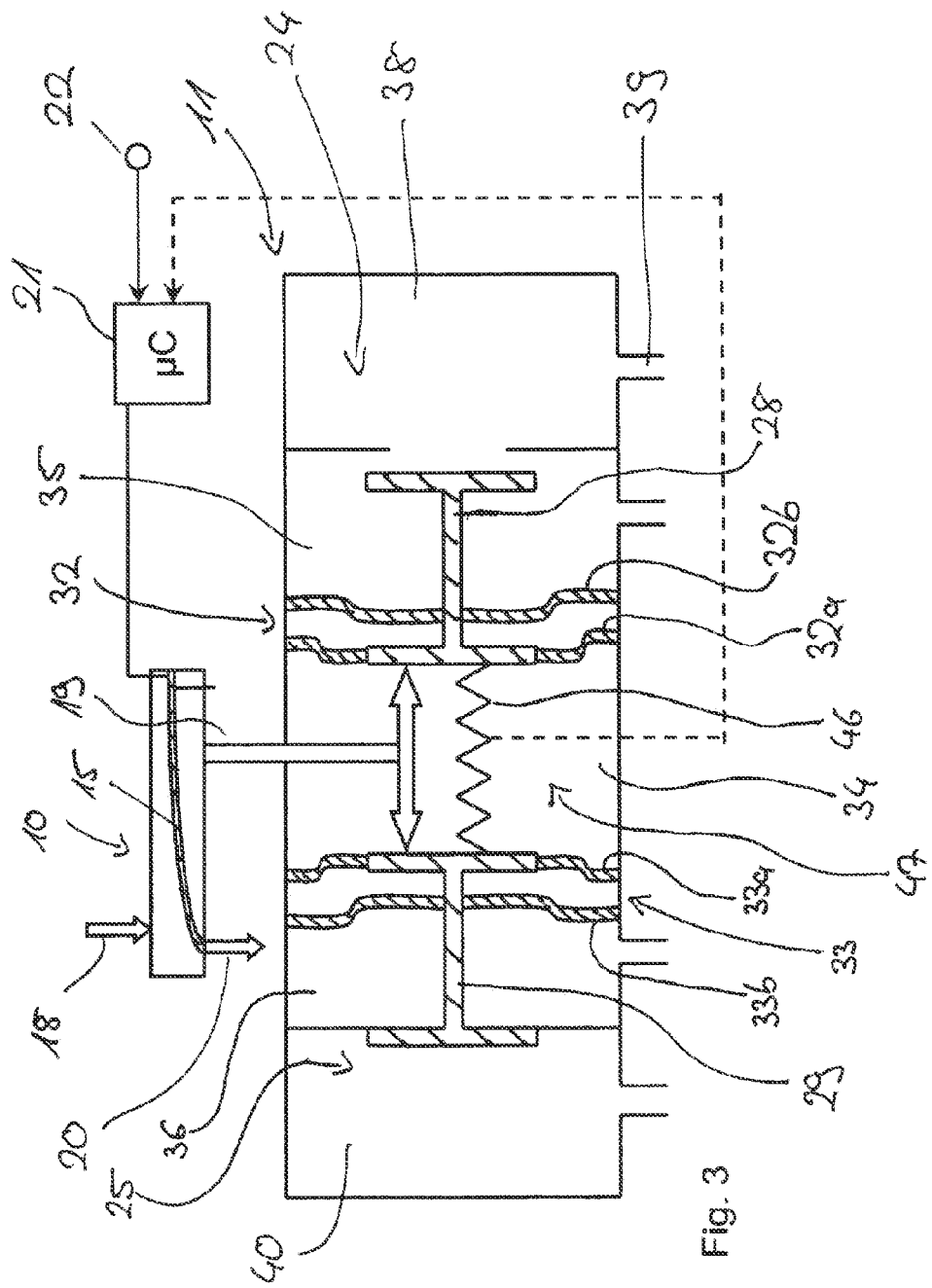
FIG. 3 shows a second exemplary embodiment of the invention as a modification of the exemplary embodiment according to FIG. 1.

The modification, illustrated in FIG. 3 (only in a corresponding section), of the positioning drive according to FIG. 1 differs from the embodiment explained in the foregoing primarily by a different type of configuration of the pressure-displacement transducer and of the sensor. And, in fact, the restoring forces acting on the two valve spindles 28 and 29 are supplied in this case by a common spring element 46, disposed in control chamber 34 and preloaded in tension. The hierarchy actuation according to the invention, whereby actuation of the two poppet valves 24 and 25 as a function of control pressure takes place in offset manner, is accordingly achieved by different design of the two diaphragm units 32 and 33 with respect to their area pressurized by the control pressure and/or to their stiffness. Above and beyond this, common spring element 46 then simultaneously represents a sensor 47, by the fact that a sensor function is integrated therein in order to measure the actual elongation of spring element 46 and to be fed back to regulating unit 21 as a variable characteristic of the operating point of the power stage, i.e. the position of the two poppet valves 24 and 25.

Figure 4:
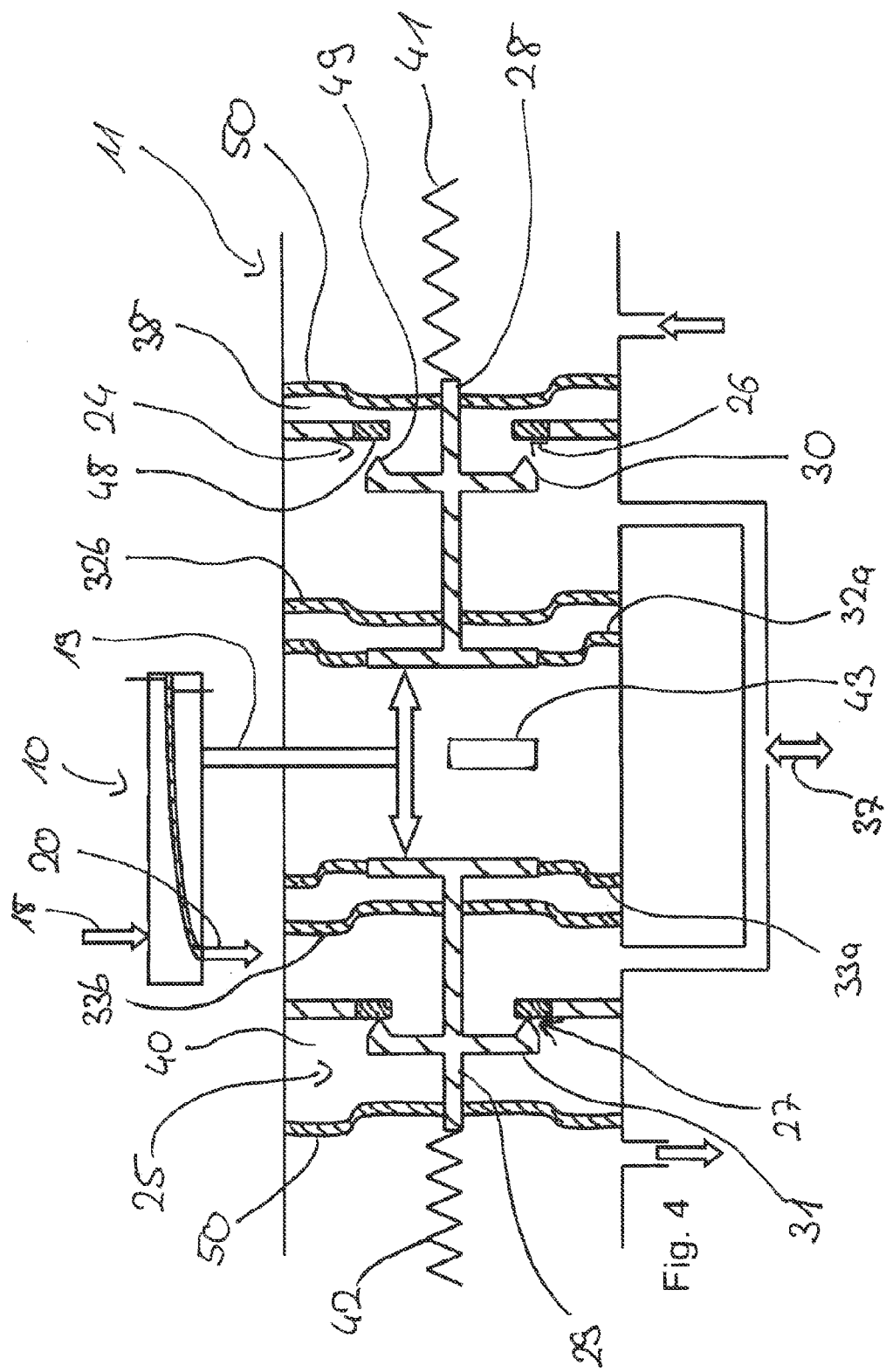
FIG. 4 shows a third exemplary embodiment of the invention as a modification of the exemplary embodiment according to FIG. 1.

FIG. 4 illustrates specific engineering options for configuration of poppet valves 24 and 25. In this case therefore, especially the use of soft-sealing poppet valves is illustrated, wherein valve seats 26 and 27 respectively are constructed on a captive seal 48 with a hardness between Shore 70 and Shore 85. And a well-defined sealing edge 49 is constructed on closing members 30 and 31 respectively of valve spindles 28 and 29 respectively. Hereby the nonlinearity of valve characteristic curves 24' and 25' already indicated in FIG. 2 (opening cross section Q vs. control pressure p) can be predetermined even more accurately, in order to permit the most sensitive positioning possible of drive element 2.

Furthermore, it is evident in FIG. 4 that a second diaphragm unit (chamber diaphragm) 50, which seals the respective second valve chamber 38 or 40 of the respective poppet valve from the environment, is joined to spindle 28 or 29 respectively of each poppet valve 24 or 25 respectively.

What is claimed is:
1. A fluidic, especially pneumatic, positioning drive, especially a valve-positioning drive, comprising:
 a drive element (2) to which pressurized fluid can be admitted; and
 a proportional position regulator (3) that regulates the admission of pressurized fluid to the drive element, wherein:
 the position regulator (3) is constructed in two stages, comprising an electrofluidic pilot stage (10) and a fluidic power stage (11);
 the electrofluidic pilot stage (10) comprises an electrical signal input (13), precisely one electromechanical transducer (14) and precisely one proportional valve (16) actuated thereby, with a pressurized-fluid inlet (18), a control-pressure outlet (19) and a vent outlet (20);
 the fluidic power stage (11) comprises two poppet valves (24, 25), which are mounted in a housing (23) and which can be pneumatically actuated via two respective pressure-displacement transducers acting on the valve spindle (28, 29) in question;
 the two pressure-displacement transducers are pressurized from a common control chamber (34), which is disposed in the housing (23) between the poppet valves (24, 25) and is in communication with the control-pressure outlet (19) of the pilot stage (10);
 in the absence of fluidic pressurization, i.e. when the control chamber (34) is unpressurized, a first (24) of the two poppet valves (24, 25) of the power stage (11) is biased into an open position and a second (25) into a closed position;
 the first pressure-displacement transducer associated with the first poppet valve (24) is matched to the second pressure-displacement transducer associated with the second poppet valve (25) in such a way that, during a steady rise of the pressure in the control chamber (34) over a working-pressure range defined by a lower operating pressure (B1) and an upper operating pressure (B2), the first poppet valve (24) is closed progressively at first and, only after the first poppet valve (24) has been closed completely, is the second poppet valve (25) opened progressively.

2. The positioning drive of claim 1, wherein both poppet valves (24, 25) are closed within a partial range, constituting a shutoff range (S), of the working-pressure range for the control pressure (p).

3. The positioning drive of claim 2, wherein the shutoff range (S) occupies between 10% and 30% of the control-pressure range attainable on the whole by the control pressure, and the mean value of the control-pressure range preferably lies within the shutoff range (S).

4. The positioning drive of claim 1, wherein the working-pressure range makes up between 95% and 85% of the control-pressure range attainable in total by the control pressure.

5. The positioning drive of claim 1, wherein the poppet valve (24, 25) and the associated pressure-displacement transducer have a nonlinear path of the characteristic curve (24; 25') of opening cross section (Q) versus control pressure (p).

6. The positioning drive of claim 1, wherein the two poppet valves (24, 25) are constructed with soft-sealing capability, in which case preferably a soft valve seat (26, 27) with a hardness between Shore 70 and Shore 85 respectively is provided.

7. The positioning drive of claim 6, wherein the valve seat (26, 27) is constructed on a captive seal (48) and/or a sealing edge (49) is constructed on the movable closing member (30, 31).

8. The positioning drive of claim 1, wherein an associated diaphragm unit (32, 33), which seals off the control chamber (34) from a first valve chamber (35, 36) of the respective poppet valve, is joined to the spindle (28, 29) of each poppet valve (24, 25).

9. The positioning drive of claim 8, wherein a second diaphragm (50), which seals off a second valve chamber (38, 40) of the respective poppet valve from the environment, is joined to the spindle (28, 29) of each poppet valve (24, 25).

10. The positioning drive of claim 1, wherein the units comprising respectively a poppet valve (24, 25) and the associated pressure-displacement transducer are disposed diametrically opposite one another.

11. The positioning drive of claim 10, wherein the pressure-displacement transducers associated with the two poppet valves (24, 25) and/or valve spindles (28, 29) are not rigidly coupled with one another.

12. The positioning drive of claim 11, wherein a sensor (43; 47) is provided which generates a signal corresponding to the relative distance from one another of elements of the two pressure-displacement transducers that react to control pressure and/or of the valve spindles (28, 29).

13. The positioning drive of claim 12, wherein the sensor (43) is disposed on a control platen, which in turn is disposed between elements of the two pressure-displacement transducers that react to control pressure.

14. The positioning drive of claim 1, wherein the electromagnetic transducer (14) of the pilot stage (10) is constructed as a piezoelectric bending transducer (15), wherein the pilot stage is preferably integrated structurally into the housing (23) of the power stage (11) or built directly onto it.

15. The positioning drive of claim 1, wherein the drive element (2) has precisely one fluidic working chamber (6), which is in communication via a working outlet (37) of the power stage (11) with the first valve chambers (35, 36), which are adjacent to the control chamber (34), of both poppet valves (24, 25), wherein the second valve chamber (38) of the first poppet valve (24) is in communication with a pressurized-fluid vent (39) and the second valve chamber (40) of the second poppet valve (25) is in communication with a pressurized-fluid supply (12).

16. The positioning drive of claim 15, wherein the pressurized-fluid (18) inlet of the pilot stage (10) is also connected to the pressurized-fluid supply (12) via a pressure limiter (17).

17. The positioning drive of claim 15, wherein the poppet valves (24, 25) of the power stage (11) occupy a switched position identical to that during failure of the pressurized-fluid supply (12) in the absence of electrical input signal to the pilot stage (10).

\* \* \* \* \*